United States Patent
Oto (10) Patent No.: US 8,749,547 B2
(45) Date of Patent: Jun. 10, 2014

(54) THREE-DIMENSIONAL STEREOSCOPIC IMAGE GENERATION

(75) Inventor: Tomohiro Oto, Tokyo (JP)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 569 days.

(21) Appl. No.: 13/013,369

(22) Filed: Jan. 25, 2011

(65) Prior Publication Data

US 2012/0026158 A1 Feb. 2, 2012

(30) Foreign Application Priority Data

Feb. 5, 2010 (JP) ................................. 2010-024627

(51) Int. Cl.
  *G06T 15/00* (2011.01)
  *G06T 15/10* (2011.01)
  *G06T 15/20* (2011.01)

(52) U.S. Cl.
  USPC .......................................... 345/419; 345/427

(58) Field of Classification Search
  CPC .............. H04N 13/00; H04N 13/0003; H04N 13/0007; H04N 13/0011; H04N 13/0014; H04N 13/0018; H04N 13/0022; H04N 13/0246; H04N 13/0497; H04N 13/0029; H04N 13/0402; H04N 13/0404; H04N 13/0409; H04N 13/0425
  USPC ................. 345/419–427, 660; 348/42, 46–48
  See application file for complete search history.

(56) References Cited

U.S. PATENT DOCUMENTS

| 5,175,616 | A  | * | 12/1992 | Milgram et al. | 348/47 |
| 5,808,591 | A  |   | 9/1998  | Mantani | |
| 6,204,876 | B1 | * | 3/2001  | Uomori et al. | 348/47 |
| 2002/0024592 | A1 | * | 2/2002 | Uomori et al. | 348/42 |
| 2003/0113012 | A1 | * | 6/2003 | Yoon | 382/154 |
| 2004/0233275 | A1 | * | 11/2004 | Tomita | 348/51 |
| 2006/0192776 | A1 | * | 8/2006 | Nomura et al. | 345/419 |
| 2006/0203085 | A1 | * | 9/2006 | Tomita | 348/51 |
| 2009/0096863 | A1 | * | 4/2009 | Kim et al. | 348/42 |
| 2009/0160934 | A1 | * | 6/2009 | Hendrickson et al. | 348/47 |
| 2010/0238272 | A1 | * | 9/2010 | Cameron et al. | 348/47 |

OTHER PUBLICATIONS

Frédéric Devernay, Sylvain Duchêne, Adrian Ramos-Peon, Adapting stereoscopic movies to the viewing conditions using depth-preserving and artifact-free novel view synthesis, 2011, Stereoscopic Displays and Applications XXII, Proc. SPIE 7863, paper 7863-1, DOI : 10.1117/12.872883.*

(Continued)

*Primary Examiner* — Xiao Wu
*Assistant Examiner* — Michael J Cobb
(74) *Attorney, Agent, or Firm* — Matthew B. Dernier, Esq.; Gibson & Dernier LLP (57) ABSTRACT

Three-dimensional image generation is used for generating, as images to be used for stereoscopic display, two images showing a scene within a virtual three-dimensional space viewed from two points of view set in the virtual three-dimensional space, the three-dimensional image generation includes: acquiring a value of a screen distance parameter, which indicates a distance from a representative position for the two points of view to a virtual screen position in the virtual three-dimensional space; and generating, as the images to be used for the stereoscopic display, the two images showing the scene within the virtual three-dimensional space viewed from the two points of view disposed at positions and in directions that are determined based on the acquired value of the screen distance parameter.

5 Claims, 3 Drawing Sheets

(56) References Cited

OTHER PUBLICATIONS

Hirokazu Yamanoue, Makoto Okui, and Fumio Okano, Geometrical Analysis of Puppet-Theater and Cardboard Effects in Stereoscopic HDTV Images, 2006, IEEE Transactions on Circuits and Systems for Video Technology, 16(6):744-752.*

Graham Jones, Delman Lee, Nicolas Holliman, David Ezra, Controlling Perceived Depth in Stereoscopic Images, 2001, Stereoscopic Displays and Virtual Reality Systems VIII, Proc. SPIE 4297, 42-53, DOI:10.1117/12.430855.*

Kenichiro Masaoka, Atsuo Hanazato, Masaki Emoto, Hirokazu Yamanoue, Yuji Nojiri, Fumio Okano, Spatial distortion prediction system for stereoscopic images, 2006, Journal of Electronic Imaging 15(1), 013002, pp. 1-12.*

* cited by examiner

THREE-DIMENSIONAL STEREOSCOPIC IMAGE GENERATION

BACKGROUND OF THE INVENTION

1. Field of the Invention

The present invention relates to a three-dimensional image generation device, a three-dimensional image generation method, and an information storage medium, which are used for generating a three-dimensional image that a viewer can visually recognize in a stereoscopic manner.

2. Description of the Related Art

Studies have been conducted on a technology for realizing stereoscopic display through which a viewer can visually recognize an image in a stereoscopic manner. As one of the stereoscopic display techniques, there is a technology of generating two images showing the same single object viewed from different points of view, and displaying the images so that one of the images (right eye image) is visually recognized through the right eye of the viewer while the other image (left eye image) is visually recognized through the left eye, respectively (see, for example, U.S. Pat. No. 5,808,591). When this technology is used for displaying a scene within a virtual three-dimensional space, two cameras, that is, a right eye camera and a left eye camera, are set in the virtual three-dimensional space, and images showing the scene within the virtual three-dimensional space viewed from the respective cameras are generated. Specifically, in order to generate the right eye image and the left eye image for stereoscopic display, it is necessary to determine positions and directions (lines of sight) of the two cameras in the virtual three-dimensional space.

In general, those positions and directions of the two cameras are determined based on two parameters. Specifically, the parameters are a parameter indicating a distance between the two cameras (hereinafter, referred to as camera interval parameter i) and a parameter regarding an angle defined by the directions of the two cameras (convergence angle) (hereinafter, referred to as convergence angle parameter $\alpha$). Based on those parameters, the positions and directions of the right eye camera and the left eye camera with respect to a reference camera position and a reference camera direction are determined. The reference camera defines a target area of a stereoscopic display, and the position, direction, and angle of view of the reference camera are used for specifying which area of the virtual three-dimensional space viewed from which direction is to be rendered.

Figure 1:
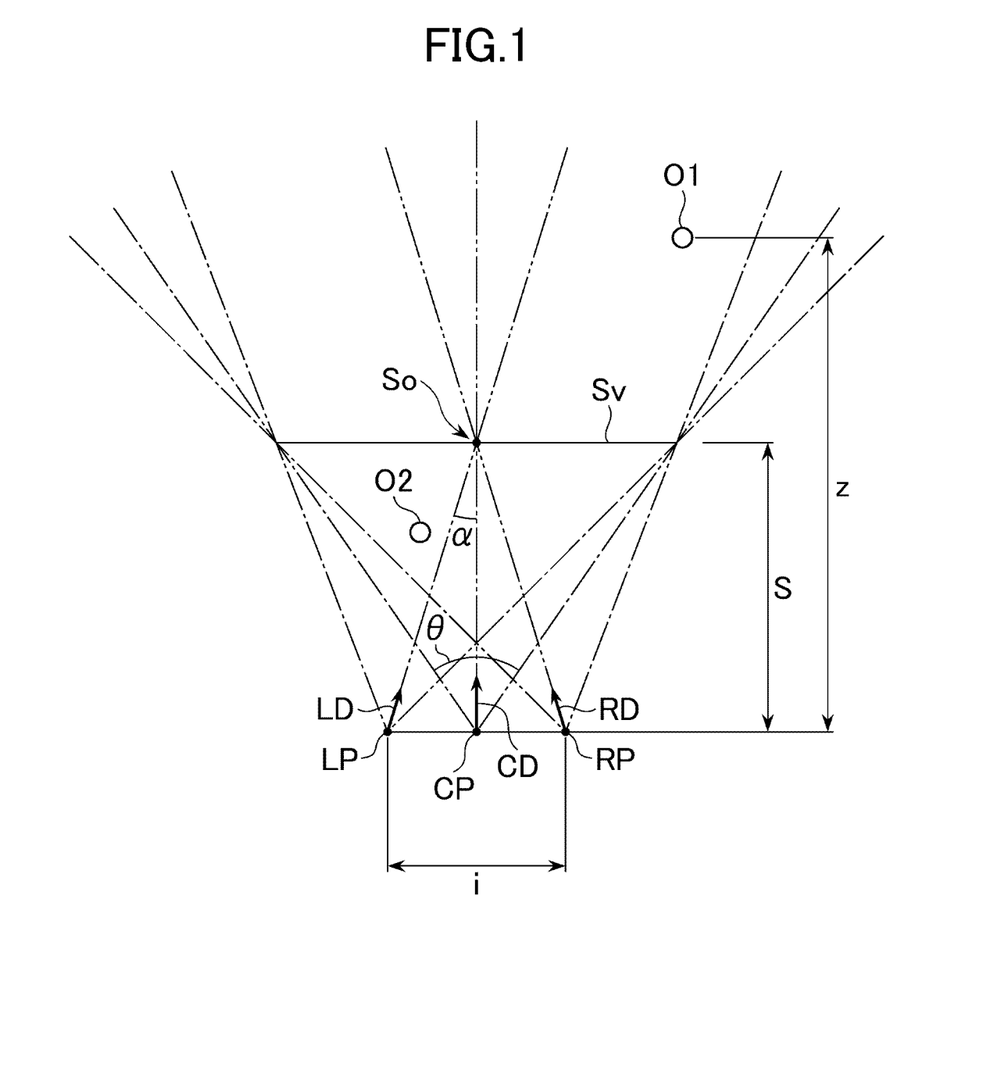
FIG. 1 is a diagram illustrating a view of a virtual three-dimensional space from above.

FIG. 1 illustrates a relation between the above-mentioned two parameters and the positions and directions of the two cameras, and illustrates a view of the virtual three-dimensional space from above. The directions of the reference camera, the right eye camera, and the left eye camera are indicated by two-dot chain lines and the angles of view of the respective cameras are indicated by chain lines. In FIG. 1, a right eye camera position RP and a left eye camera position LP are determined so that the two cameras are spaced apart from each other by the distance i with a reference camera position CP set as the center therebetween. The right eye camera and the left eye camera are both disposed so as to be included in a horizontal plane and in a plane orthogonal to a reference camera direction CD. A right eye camera direction RD is determined as a direction inclined by an angle $+\alpha$ from the reference camera direction CD in the horizontal plane, and a left eye camera direction LD is determined as a direction inclined by an angle $-\alpha$ from the reference camera direction CD in the horizontal plane. That is, the angle $\alpha$, corresponds to half an angle defined by the right eye camera direction RD and the left eye camera direction LD.

In this example, a virtual display screen (hereinafter, referred to as virtual screen Sv) exists in a plane orthogonal to the reference camera direction CD with an intersection of the two camera directions (point So of FIG. 1) set as the center thereof. The virtual screen Sv corresponds to a display screen of a stereoscopic display device for stereoscopic display in a real space. A relative depth of the virtual screen Sv to objects located in the virtual three-dimensional space when viewed from the reference camera is identical with a relative depth of the display screen of the stereoscopic display device to virtual positions of the objects displayed in a stereoscopic manner when viewed from the viewer. Specifically, an object O1 located behind the virtual screen Sv when viewed from the reference camera position CP is recognized by the viewer as being farther from the viewer than the display screen when displayed in a stereoscopic manner. On the other hand, an object O2 located in front of the virtual screen Sv (on the reference camera position CP side) is recognized by the viewer as being closer to the viewer than the display screen. A horizontal width of the virtual screen Sv is determined according to a horizontal angle of view $\theta$ of the reference camera, and the angles of view of the right eye camera and the left eye camera are determined so that the virtual screen Sv is included in their fields of view.

SUMMARY OF THE INVENTION

In a case where a creator of the three-dimensional image or other such person designates the camera interval parameter i and the convergence angle parameter $\alpha$ to determine the positions and directions of the right eye camera and the left eye camera, the position of the virtual screen Sv changes depending on both the camera interval parameter i and the convergence angle parameter $\alpha$, and hence the position of the virtual screen Sv is hard to know intuitively. As a result, a great deal of time and effort may be required to align the virtual screen Sv to a desired position in the virtual three-dimensional space. However, recognizability of an image to a viewer is affected by the determination as to the position of the display target object relative to the virtual screen Sv (whether the display target object is located in front of or behind the virtual screen Sv, or whether the display target object is located farther or closer than the virtual screen Sv). Therefore, when generating and displaying a three-dimensional image, the creator of the three-dimensional image needs to determine the camera positions which allow generating a three-dimensional image that is easy for the viewer to visually recognize, while trying to variously change the camera interval parameter i and the convergence angle parameter $\alpha$.

The present invention has been made in view of the above-mentioned circumstances, and it is therefore an object thereof to provide a three-dimensional image generation device, a three-dimensional image generation method, and an information storage medium having a three-dimensional image generation program stored therein, which are capable of generating with relative ease a three-dimensional image that is easy for a viewer to visually recognize.

According to the present invention, there is provided a computer-readable information storage medium having stored therein a three-dimensional image generation program for generating, as images to be used for stereoscopic display, two images showing a scene within a virtual three-dimensional space viewed from two cameras set in the virtual three-dimensional space, the three-dimensional image generation program causing a computer to function as: parameter value acquisition means for acquiring a value of a screen distance parameter, which indicates a distance from a representative position for the two cameras to a virtual display screen in the virtual three-dimensional space; and three-dimensional image generation means for generating, as the images to be used for the stereoscopic display, the two images showing the scene within the virtual three-dimensional space viewed from the two cameras disposed at positions and in directions that are determined based on the acquired value of the screen distance parameter.

In the three-dimensional image generation program, the parameter value acquisition means may further acquire a value of a perspective parameter, which indicates a degree of perspective in the stereoscopic display, and the three-dimensional image generation means may generate, as the images to be used for the stereoscopic display, the two images showing the scene within the virtual three-dimensional space viewed from the two cameras disposed at positions and in directions that are determined based on the value of the screen distance parameter and the value of the perspective parameter.

Further, the parameter value acquisition means may further acquire a value of a parameter indicating a width of a display screen on which the stereoscopic display is performed, and the three-dimensional image generation means may generate, as the images to be used for the stereoscopic display, the two images showing the scene within the virtual three-dimensional space viewed from the two cameras disposed at positions and in directions that are determined based on the value of the screen distance parameter and the value of the parameter indicating the width of the display screen.

Further, in the three-dimensional image generation program, the screen distance parameter may be defined by the following mathematical expression:

[Expression 1]

$$i = 2S \cdot \tan \alpha \quad (1)$$

where S represents a screen distance parameter, i represents a distance between the two cameras, and α represents an angle corresponding to half an angle defined by the directions of the two cameras.

Further, in the three-dimensional image generation program, the perspective parameter may be defined by the following mathematical expression:

[Expression 2]

$$r \cdot I \cdot \tan \frac{\theta}{2} = W \cdot \tan \alpha \quad (2)$$

where r represents a perspective parameter, I represents an interocular distance of a viewer of the stereoscopic display, θ represents a horizontal angle of view of a reference camera, which defines a field of view of the stereoscopic display within the virtual three-dimensional space, W represents a width of a display screen on which the stereoscopic display is performed, and α represents an angle corresponding to half an angle defined by the directions of the two cameras.

Further, according to the present invention, there is provided a three-dimensional image generation device for generating, as images to be used for stereoscopic display, two images showing a scene within a virtual three-dimensional space viewed from two cameras set in the virtual three-dimensional space, the three-dimensional image generation device including: parameter value acquisition means for acquiring a value of a screen distance parameter, which indicates a distance from a representative position for the two cameras to a virtual display screen in the virtual three-dimensional space; and three-dimensional image generation means for generating, as the images to be used for the stereoscopic display, the two images showing the scene within the virtual three-dimensional space viewed from the two cameras disposed at positions and in directions that are determined based on the acquired value of the screen distance parameter.

Further, according to the present invention, there is provided a three-dimensional image generation method of generating, as images to be used for stereoscopic display, two images showing a scene within a virtual three-dimensional space viewed from two cameras set in the virtual three-dimensional space, the three-dimensional image generation method including: acquiring a value of a screen distance parameter, which indicates a distance from a representative position for the two cameras to a virtual screen position in the virtual three-dimensional space; and generating, as the images to be used for the stereoscopic display, the two images showing the scene within the virtual three-dimensional space viewed from the two cameras disposed at positions and in directions that are determined based on the acquired value of the screen distance parameter.

DETAILED DESCRIPTION OF THE INVENTION

Hereinbelow, an embodiment of the present invention is described in detail with reference to the accompanying drawings.

Figure 2:
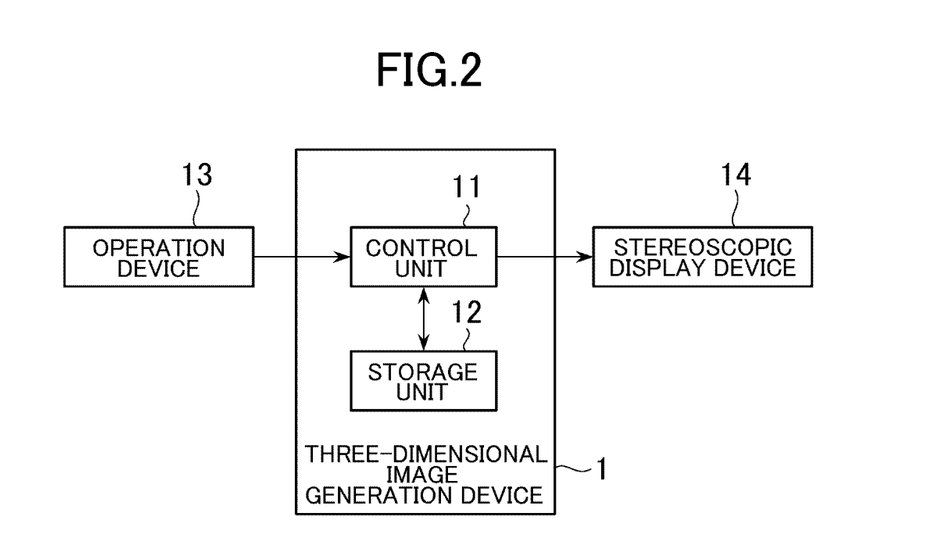
FIG. 2 is a block diagram illustrating a configuration of a three-dimensional image generation device according to an embodiment of the present invention.

FIG. 2 is a configuration diagram of a three-dimensional image generation device 1 according to the embodiment of the present invention. The three-dimensional image generation device 1 is a device for generating images to be used for stereoscopic display, which a viewer V can visually recognize in a stereoscopic manner, and specifically, generates two images, that is, a right eye image to be recognized by the right eye of the viewer V and a left eye image to be recognized by the left eye. By visually recognizing those two images through his/her eyes, respectively, the viewer V can recognize a part of the image to be closer thereto and another part of the image to be farther therefrom. As a result, the viewer V can perceive contents of the image in a stereoscopic manner. Further, the three-dimensional image generation device 1 according to this embodiment generates a three-dimensional image showing a scene within a virtual three-dimensional space in which a display target object is located.

The three-dimensional image generation device 1 is an information processing device such as a server computer or a video game console, and as illustrated in FIG. 2, includes a control unit 11 and a storage unit 12. Further, the three-dimensional image generation device 1 is connected to an operation device 13 and a stereoscopic display device 14.

The control unit 11 includes a CPU or the like, and executes various kinds of information processing according to a program stored in the storage unit 12. Description is later given of details of processing executed by the control unit 11 in this embodiment.

The storage unit 12 includes a memory device such as a RAM or a ROM, and stores the program executed by the control unit 11 and various kinds of data. The storage unit 12 also functions as a work memory for the control unit 11. In this embodiment, various kinds of information on the virtual three-dimensional space are stored in the storage unit 12, to thereby build the virtual three-dimensional space in the three-dimensional image generation device 1.

The operation device 13 is a keyboard and mouse, or a controller of a video game console. The operation device 13 receives a user's operation input, and outputs a signal indicating the content to the control unit 11.

The stereoscopic display device 14 is a device for displaying an image generated by the control unit 11, and in this embodiment, displays a three-dimensional image based on the above-mentioned right eye image and left eye image. Specifically, for example, the three-dimensional image generation device 1 generates a three-dimensional image by arranging the right eye image and the left eye image at an interval. Alternatively, the three-dimensional image generation device 1 may generate a single three-dimensional image by arranging the right eye image and the left eye image in alternate pixel rows. The stereoscopic display device 14 displays the three-dimensional image thus generated by the three-dimensional image generation device 1. At this time, the stereoscopic display device 14 needs to display the right eye image and the left eye image so as to be visible to the viewer V through his/her right eye and left eye, respectively. Various methods are known to realize such stereoscopic display. For example, the stereoscopic display device 14 may include a display screen having polarizing plates disposed therein which have different polarization planes for pixels for displaying the right eye image and for pixels for displaying the left eye image, respectively. In this case, the viewer V wears glasses with two polarizing plates corresponding to those two polarization planes to view the three-dimensional image. In this manner, the right eye can be controlled to solely receive light from the pixels for displaying the right eye image and the left eye can be controlled to solely receive light from the pixels for displaying the left eye image.

Next, description is given of functions implemented by the three-dimensional image generation device 1 according to this embodiment. As illustrated in a functional block diagram of FIG. 3, the three-dimensional image generation device 1 functionally includes a virtual space management section 21, a parameter value acquisition section 22, and a three-dimensional image generation section 23. With those functions, the three-dimensional image generation device 1 generates the two images, that is, the right eye image and the left eye image, which are used for stereoscopic display of a scene within the virtual three-dimensional space. Those functions are implemented by the control unit 11 executing the program stored in the storage unit 12. This program may be stored in various kinds of computer-readable information storage medium such as an optical disk when provided, or may be provided via a communication network such as the Internet.

Figure 3:
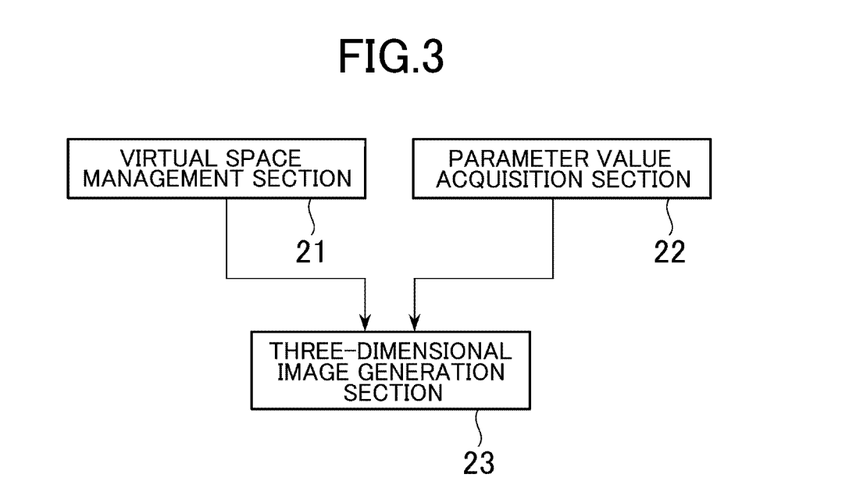
FIG. 3 is a functional block diagram illustrating functions of the three-dimensional image generation device according to the embodiment of the present invention.

The virtual space management section 21 manages information on the virtual three-dimensional space built in the storage unit 12. Specifically, the virtual space management section 21 acquires information on various objects located in the virtual three-dimensional space, and stores the information in the storage unit 12. Further, the virtual space management section 21 updates the information on the objects that is stored in the storage unit 12, to thereby realize movement and deformation of each object in the virtual three-dimensional space, and interactions between the objects. The information on the objects includes information on a shape and size of each object and information on a position and direction of the object in the virtual three-dimensional space.

Further, the virtual space management section 21 acquires and holds information on a reference camera position CP and information on a reference camera direction CD in the virtual three-dimensional space. Those information items are used for determining which area of the virtual three-dimensional space viewed from which direction is to be generated as an image, and may be determined by, for example, a creator of contents (moving image, game and so on) targeted for stereoscopic display. Alternatively, the reference camera position CP and the reference camera direction CD may be changed with time in response to an instruction input from the viewer V through the operation device 13. In this case, the viewer V operates the operation device 13 while viewing a scene within the virtual three-dimensional space, to thereby change the reference camera position CP and the reference camera direction CD. As a result, the viewer V can view a scene of moving around the virtual three-dimensional space.

The parameter value acquisition section 22 acquires values of two parameters used for determining the positions and directions of a right eye camera and a left eye camera in the virtual three-dimensional space. Those two parameters are different from a camera interval parameter i and a convergence angle parameter $\alpha$, which directly define the positions and directions of the two cameras. In this embodiment, specifically, the parameter value acquisition section 22 acquires a screen distance parameter S indicating a distance from the reference camera position CP to a virtual screen Sv in the virtual three-dimensional space, and a perspective parameter r indicating a degree of perspective (sense of depth) of the three-dimensional image to be displayed.

As illustrated in FIG. 1, the screen distance parameter S indicates a distance within the virtual three-dimensional space from the reference camera position CP, which is a representative position for the right eye camera and the left eye camera, to the virtual screen Sv. The screen distance parameter S is defined by Expression (1) below using the camera interval parameter i and the convergence angle parameter $\alpha$.

[Expression 1]

$$i = 2S \cdot \tan \alpha \qquad (1)$$

The perspective parameter r takes a value ranging from 0 to 1. The value "0" corresponds to display creating no sense of depth, that is, conventional two-dimensional display, whereas the value "1" corresponds to a three-dimensional image reproducing with high fidelity a distance in the depth direction (reference camera direction CD) within the virtual three-dimensional space. Therefore, as the value of the perspective parameter r approximates 1, the stereoscopic display is performed providing a higher sense of depth. When the value of the perspective parameter r is 1, in particular, the three-dimensional image is generated so as to keep a constant ratio between the distance in the depth direction from the viewer V to a virtual position of the object targeted for stereoscopic display and the distance in the depth direction within the virtual three-dimensional space from the reference camera position CP to the object. When the value of the perspective parameter r is 0, conversely, the right eye image and the left eye image are identical with each other, with the result that the display is performed as if all the objects were located on the display screen when viewed from the viewer V.

The perspective parameter r is defined by Expression (2) below using the convergence angle parameter α, a horizontal angle of view θ of a reference camera, and further, two parameters I and W.

[Expression 2]

$$r \cdot I \cdot \tan\frac{\theta}{2} = W \cdot \tan\alpha \tag{2}$$

Figure 4:
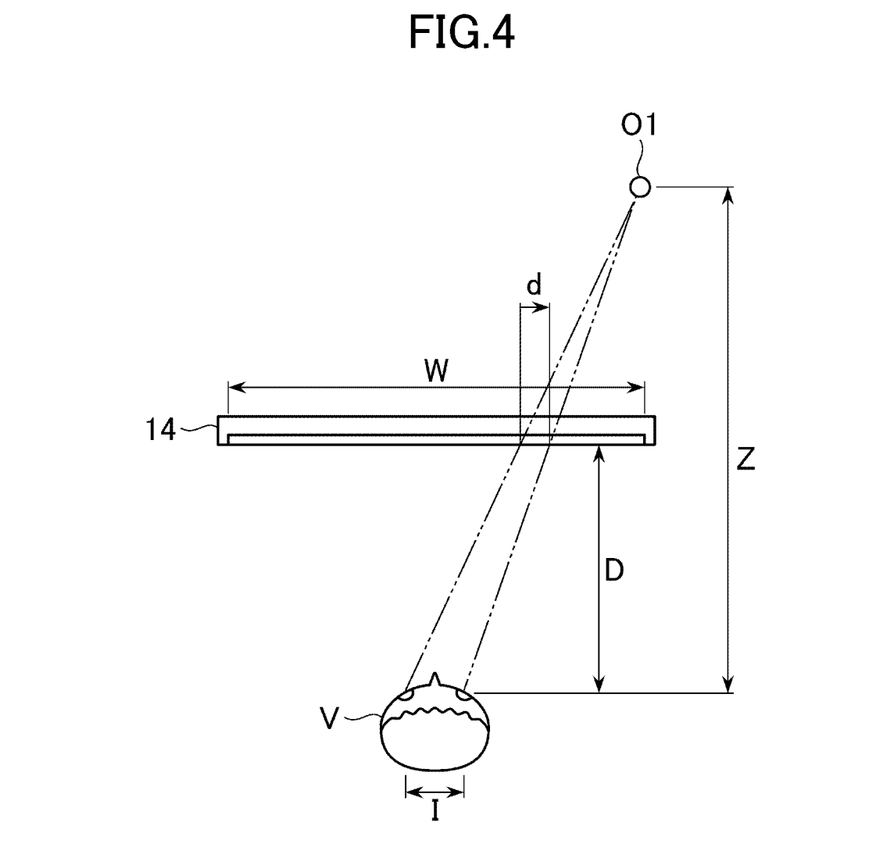
FIG. 4 is a diagram illustrating a view of a stereoscopic display device and a viewer in a real space from above.

In this expression, the parameters I and W indicate two lengths within a real space in which the stereoscopic display is actually performed. FIG. 4 is a diagram illustrating a positional relation between the viewer V and the stereoscopic display device 14 in the real space, and illustrates a view of the viewer V and the stereoscopic display device 14 from above. As illustrated in FIG. 4, I represents an interocular distance of the viewer V, while W represents a width of the display screen of the stereoscopic display device 14 for stereoscopic display. As is apparent from Expression (2), when r=0, α=0, and thus a right eye camera position RP and a left eye camera position LP are identical with each other.

In FIG. 4, D represents a distance from the viewer V to the display screen of the stereoscopic display device 14. Z represents a distance in the depth direction from the viewer V to a virtual position of an object O1 of FIG. 1, in a case where the stereoscopic display device 14 displays the object O1 in a stereoscopic manner. Further, d corresponds to a degree of parallax at the time when the viewer V views the object O1, and represents a distance between the display position of the object O1 within the left eye image and the display position thereof within the right eye image. Note that, d takes a positive value when the virtual position of the object is behind the display screen, and takes a negative value when the virtual position of the object is in front of the display screen. Provided that, as illustrated in FIG. 1, z represents a distance in the depth direction within the virtual three-dimensional space from the reference camera position CP to the object O1, d and Z are expressed as in Expressions (3) and (4) below using the parameters S and r, respectively.

[Expression 3]

$$d = r \cdot I \cdot \left(1 - \frac{S}{z}\right) \tag{3}$$

[Expression 4]

$$Z = D \cdot \frac{z}{rS + (1-r)z} \tag{4}$$

Now, description is given of a method of acquiring the values of the parameters S and r by the parameter value acquisition section 22. In a case where the three-dimensional image generation device 1 is used for creating contents targeted for stereoscopic display, the parameter value acquisition section 22 receives an operation input from the content creator to acquire the values of those two parameters S and r. The content creator may perform the operation input to designate the values of the parameters S and r with respect to the operation device 13 or a client terminal connected to the three-dimensional image generation device 1 via the communication network. Alternatively, in a case where the three-dimensional image generation device 1 is a video game console or the like and executes a program such as a game program to generate the three-dimensional image, the values of the parameters S and r may be provided to the three-dimensional image generation device 1 together with the data of the program. Specifically, in a case where this program is stored in an information storage medium such as an optical disk when provided, the parameter value acquisition section 22 reads the values of the parameters S and r from this information storage medium. Alternatively, in a case where the program is provided via the communication network, the parameter value acquisition section 22 may acquire the values of the parameters S and r from another server computer or the like via the communication network. Further, the values of the parameters S and r may be designated by an operation input performed through the operation device 13 by the viewer V himself/herself who is, for example, a game player viewing the three-dimensional image generated by the three-dimensional image generation device 1.

Specifically, in consideration of the location of the objects targeted for stereoscopic display in the virtual three-dimensional space, the content creator or the viewer V designates the value of the screen distance parameter S so that those objects become easy to view. In this case, it is desired that the value of the screen distance parameter S be determined so that as many objects as possible are located behind the virtual screen Sv when viewed from the reference camera position CP. In this manner, each of the objects can be easy for the viewer V to view.

Further, the content creator or the viewer V designates the value of the perspective parameter r. At this time, the position of the virtual screen Sv is not affected even if the value of the perspective parameter r is changed, and hence the value of the perspective parameter r may be determined arbitrarily depending on how much the perspective of the image targeted for stereoscopic display is emphasized. In this manner, the values of the screen distance parameter S and the perspective parameter r may be designated independently of each other.

Note that, the parameter value acquisition section 22 may acquire the value of the width W of the display screen of the stereoscopic display device 14 in addition to the values of the screen distance parameter S and the perspective parameter r. In this case, similarly to the screen distance parameter S and the perspective parameter r, the value of the width W of the display screen may be designated by an operation input from the content creator or the viewer V. Further, the parameter value acquisition section 22 may receive an input of information on the display screen from the stereoscopic display device 14 to acquire information on the width W of the display screen. When the stereoscopic display device 14 is connected to the three-dimensional image generation device 1 in conformity to the high-definition multimedia interface (HDMI) standard, for example, the three-dimensional image generation device 1 can acquire such information on a screen size from the stereoscopic display device 14.

The three-dimensional image generation section 23 uses the values of the screen distance parameter S and the perspective parameter r acquired by the parameter value acquisition section 22 to generate the right eye image and the left eye image. As is apparent from Expressions (1) and (2), when the values of the screen distance parameter S, the perspective parameter r, the width W of the display screen, the angle of view θ of the reference camera, and the interocular distance I of the viewer V are determined, the values of the camera interval parameter i and the convergence angle parameter α are determined uniquely. Therefore, the right eye camera position RP, the left eye camera position LP, a right eye camera direction RD, and a left eye camera direction LD may also be determined uniquely. The three-dimensional image generation section 23 generates, as the right eye image and the left eye image, images showing a scene within the virtual three-dimensional space viewed from the right eye camera and the left eye camera disposed at the positions and in the directions that are thus determined based on the values of the screen distance parameter S and the perspective parameter r.

In this case, the angle of view θ of the reference camera takes a predetermined value. As the value of the interocular distance I of the viewer V, a value indicating an interocular distance of a general person may be stored in the storage unit 12 in advance. Further, as the value of the width W of the display screen, in the case where the parameter value acquisition section 22 acquires the value as described above, the acquired value may be used, and in other cases, a value stored in the storage unit 12 in advance may be used as a value indicating the size of a general stereoscopic display device. As is apparent from Expression (2), the value of the convergence angle parameter α changes depending on the width W of the display screen. However, the values of the screen distance parameter S and the perspective parameter r may be set arbitrarily by the content creator or the viewer V depending on how he/she wishes to perform the stereoscopic display, irrespective of the value of the width W of the display screen. Conversely, if the parameter value acquisition section 22 acquires the value of the width W of the display screen to determine the positions and directions of the right eye camera and the left eye camera based on this value of the width W of the display screen, the positional relation and perspective of the objects relative to the display screen can be kept substantially the same irrespective of the size of the display screen for stereoscopic display.

Specifically, the three-dimensional image generation section 23 transforms position coordinates Vview in a viewing coordinate system with the reference camera position CP and the reference camera direction CD set as references, into position coordinates in a screen coordinate system, which indicate a position in the right eye image. The transformation is expressed in Expression (5) below using a projection matrix Mr.

[Expression 5]

$$Mr \times Vview = \text{translation}\begin{pmatrix} +A \\ 0 \\ 0 \end{pmatrix} \times Mconv \times \text{translation}\begin{pmatrix} -B \\ 0 \\ 0 \end{pmatrix} \times Vview \quad (5)$$

Further, the three-dimensional image generation section 23 transforms the same position coordinates Vview as above into position coordinates in the screen coordinate system, which indicate a position in the left eye image. The transformation is expressed in Expression (6) below using a projection matrix Ml.

[Expression 6]

$$Ml \times Vview = \text{translation}\begin{pmatrix} -A \\ 0 \\ 0 \end{pmatrix} \times Mconv \times \text{translation}\begin{pmatrix} +B \\ 0 \\ 0 \end{pmatrix} \times Vview \quad (6)$$

Note that, the screen coordinate system in this case has the center of the display screen set as the origin point. In Expressions (5) and (6), Mconv represents a projection matrix at the time of generating an image viewed from the reference camera position CP in the reference camera direction CD (that is, conventional two-dimensional image). Further, translation( ) represents a translation matrix, and values of variables A and B are calculated by Calculation Expressions (7) and (8) below using the values of the parameters r and S, respectively. Equalities in parentheses of those expressions represent calculation expressions in a case where the values of the variables A and B are calculated using the parameters i and α.

[Expression 7]

$$A = \frac{r \cdot I}{W} \left( = \frac{\tan \alpha}{\tan \frac{\theta}{2}} \right) \quad (7)$$

[Expression 8]

$$B = A \cdot S \cdot \tan \frac{\theta}{2} \left( = \frac{i}{2} \right) \quad (8)$$

By transforming the vertex coordinates of each object located in the virtual three-dimensional space into the positions in the right eye image and the left eye image using the above-mentioned projection matrices Mr and Ml, respectively, the right eye image and the left eye image are generated. The three-dimensional image generation section 23 outputs to the stereoscopic display device 14 the right eye image and the left eye image, or the three-dimensional image obtained by combining those images. In this manner, the three-dimensional image is displayed on the stereoscopic display device 14.

The above-mentioned three-dimensional image generation device 1 according to this embodiment generates the three-dimensional image using the values of the screen distance parameter S and the perspective parameter r, which define features of the three-dimensional image itself to be displayed. Thus, the content creator or the viewer can easily create the three-dimensional image that is easy to visually recognize, compared to the case where the three-dimensional image is generated by designating the values of the camera interval parameter i and the convergence angle parameter α.

Note that, the embodiment of the present invention is not limited to the description above. For example, in the description above, the content creator or the viewer designates the values of both the screen distance parameter S and the perspective parameter r, but the parameter value acquisition section 22 may particularly acquire only the screen distance parameter S which affects the visual recognizability for the viewer. In this case, the three-dimensional image generation section 23 may generate the three-dimensional image assuming the value of the perspective parameter r to be, for example, 1 or other such fixed value.

Further, the positions and directions of the right eye camera and the left eye camera with respect to the reference camera position CP and the reference camera direction CD may be determined to have a relation different from that of FIG. 1. For example, one of the right eye camera and the left eye camera may be disposed at a position identical with the reference camera position CP, and the other camera may be disposed at a position spaced apart by the distance i from the reference camera position CP.

While there have been described what are at present considered to be certain embodiments of the invention, it will be understood that various modifications may be made thereto, and it is intended that the appended claims cover all such modifications as fall within the true spirit and scope of the invention.

What is claimed is:

1. A non-transitory, computer-readable information storage medium having stored therein a three-dimensional image generation program for generating, as images to be used for stereoscopic display, two images showing a scene within a virtual three-dimensional space viewed from two points of view, respectively, set in the virtual three-dimensional space, the three-dimensional image generation program causing a computer to function as:

parameter value acquisition unit configured to acquire a value of a screen distance parameter, which indicates a distance from a representative position for the two points of view to a virtual display screen in the virtual three-dimensional space, and configured to acquire a value of a perspective parameter, which indicates a degree of perspective in the stereoscopic display; and three-dimensional image generation unit configured to generate, as the images to be used for the stereoscopic display, the two images showing the scene within the virtual three-dimensional space viewed from the two points of view disposed at positions and in directions that are determined based on the acquired value of the screen distance parameter and the value of the perspective parameter, wherein the perspective parameter is a variable in the following mathematical expression:

$$r = (W \cdot \tan \alpha)/(I \cdot \tan \theta/2)$$

where r represents the perspective parameter and is limited to being between 0 and 1, I represents an interocular distance of a viewer of the stereoscopic display, $\theta$ represents a horizontal angle of view of a reference point of view, which defines a field of view of the stereoscopic display within the virtual three-dimensional space, W represents a width of a display screen on which the stereoscopic display is performed, and $\alpha$ represents an angle corresponding to half an angle defined by the directions of the two points of view.

2. The non-transitory, computer-readable information storage medium according to claim 1, wherein:

the parameter value acquisition unit is configured to acquire a value of a parameter indicating a width of a display screen on which the stereoscopic display is performed; and the three-dimensional image generation unit is configured to generate, as the images to be used for the stereoscopic display, the two images showing the scene within the virtual three-dimensional space viewed from the two points of view at positions and in directions that are determined based on the value of the screen distance parameter, the value of the perspective parameter and the value of the parameter indicating the width of the display screen.

3. The non-transitory, computer-readable information storage medium according to claim 1, wherein the screen distance parameter is a variable in the following mathematical expression:

$$S = i/2(\tan \alpha)$$

where S represents the screen distance parameter, i represents a distance between the two cameras, and $\alpha$ represents an angle corresponding to half an angle defined by the directions of the two cameras.

4. A three-dimensional image generation device configured to generate, as images to be used for stereoscopic display, two images showing a scene within a virtual three-dimensional space viewed from two points of view, respectively, set in the virtual three-dimensional space, the three-dimensional image generation device including a processor operating under the control of a computer program to implement functional units, comprising:

parameter value acquisition unit configured to acquire a value of a screen distance parameter, which indicates a distance from a representative position for the two points of view to a virtual display screen in the virtual three-dimensional space, and configured to acquire a value of a perspective parameter, which indicates a degree of perspective in the stereoscopic display; and three-dimensional image generation unit configured to generate, as the images to be used for the stereoscopic display, the two images showing the scene within the virtual three-dimensional space viewed from the two points of view disposed at positions and in directions that are determined based on the acquired value of the screen distance parameter and the value of the perspective parameter, wherein the perspective parameter is a variable in the following mathematical expression:

$$r = (W \cdot \tan \alpha)/(I \cdot \tan \theta/2)$$

where r represents the perspective parameter and is limited to being between 0 and 1, I represents an interocular distance of a viewer of the stereoscopic display, $\theta$ represents a horizontal angle of view of a reference point of view, which defines a field of view of the stereoscopic display within the virtual three-dimensional space, W represents a width of a display screen on which the stereoscopic display is performed, and $\alpha$ represents an angle corresponding to half an angle defined by the directions of the two points of view.

5. A three-dimensional image generation method of generating, as images to be used for stereoscopic display, two images showing a scene within a virtual three-dimensional space viewed from two points of view, respectively, set in the virtual three-dimensional space, the three-dimensional image generation method comprising:

acquiring a value of a screen distance parameter, which indicates a distance from a representative position for the two points of view to a virtual screen position in the virtual three-dimensional space;

acquiring a value of a perspective parameter, which indicates a degree of perspective in the stereoscopic display; and generating, as the images to be used for the stereoscopic display, the two images showing the scene within the virtual three-dimensional space viewed from the two points of view disposed at positions and in directions that are determined based on the acquired value of the screen distance parameter and the value of the perspective parameter, wherein the perspective parameter is a variable in the following mathematical expression:

$$r = (W \cdot \tan \alpha)/(I \cdot \tan \theta/2)$$

where r represents the perspective parameter and is limited to being between 0 and 1, I represents an interocular distance of a viewer of the stereoscopic display, $\theta$ represents a horizontal angle of view of a reference point of view, which defines a field of view of the stereoscopic display within the virtual three-dimensional space, W represents a width of a display screen on which the stereoscopic display is performed, and α represents an angle corresponding to half an angle defined by the directions of the two points of view.

* * * * *